United States Patent [19]

Waltho

[11] Patent Number: 5,696,355
[45] Date of Patent: Dec. 9, 1997

[54] LETTER WEIGHING DEVICE WITH SLIDABLE FULCRUM

[76] Inventor: Barry Stanton Waltho, 14 Primrose Cottages, Bowdon Vale, Altrincham, Cheshire WA14 3EL, United Kingdom

[21] Appl. No.: 535,162
[22] PCT Filed: Apr. 20, 1994
[86] PCT No.: PCT/GB94/00838
§ 371 Date: Mar. 29, 1996
§ 102(e) Date: Mar. 29, 1996
[87] PCT Pub. No.: WO94/24525
PCT Pub. Date: Oct. 27, 1994

[30] Foreign Application Priority Data

Apr. 21, 1993 [GB] United Kingdom ............. 9308225

[51] Int. Cl.⁶ .................... G01G 19/00; G01G 19/54
[52] U.S. Cl. .................... 177/126; 177/131; 177/148; 177/150; 177/190; 177/246; 177/250; 177/251
[58] Field of Search ........................ 177/126, 127, 177/129, 131, 148, 150, 190, 191, 246, 251, 250

[56] References Cited

U.S. PATENT DOCUMENTS

| 69,948 | 10/1867 | Taylor | 177/246 |
|---|---|---|---|
| 223,296 | 1/1880 | Richardson | 177/250 |
| 243,753 | 7/1881 | Barton | 177/246 |
| 440,959 | 11/1890 | O'Marra | 177/246 |
| 1,201,063 | 10/1916 | Litchfield | 177/246 |
| 1,872,646 | 8/1932 | Behrens | 177/126 |
| 2,963,286 | 12/1960 | Fischer | 265/53 |
| 4,840,241 | 6/1989 | Ishikawa | 177/172 |

FOREIGN PATENT DOCUMENTS

| 2069553U | 4/1991 | China | G01G 21/16 |
|---|---|---|---|
| 2090523U | 6/1991 | China | G01G 1/18 |
| 321996 | 6/1920 | Germany . | |
| 2 931 419 | 2/1981 | Germany . | |
| 50-153993 | 12/1974 | Japan . | |
| WO 91/02952 | 3/1991 | WIPO . | |

OTHER PUBLICATIONS

Abstract of DE 2 931 419 in English No Date Given.

Primary Examiner—Lincoln Donovan
Assistant Examiner—Randy W. Gibson
Attorney, Agent, or Firm—Pravel, Hewitt, Kimball & Krieger

[57] ABSTRACT

A letter weighing device has a slidable fulcrum to indicate the exact weight of a letter or the like being weighed. The letter weighing device has an elongate member having upper and lower elongate surfaces, the upper elongate surface supporting two spaced apart and substantially parallel resilient ribs extending longitudinally along the elongate member so as to define a recess therebetween. Further, at least a portion of each rib extends in a direction generally toward the other rib. A fulcrum member is mounted upon the upper surface so as to be moveable along the length of the elongate member. The fulcrum member supports the elongate member from above. Additionally, a parallel pair of ribs define a recess therebetween in which additional items can be stored.

21 Claims, 3 Drawing Sheets

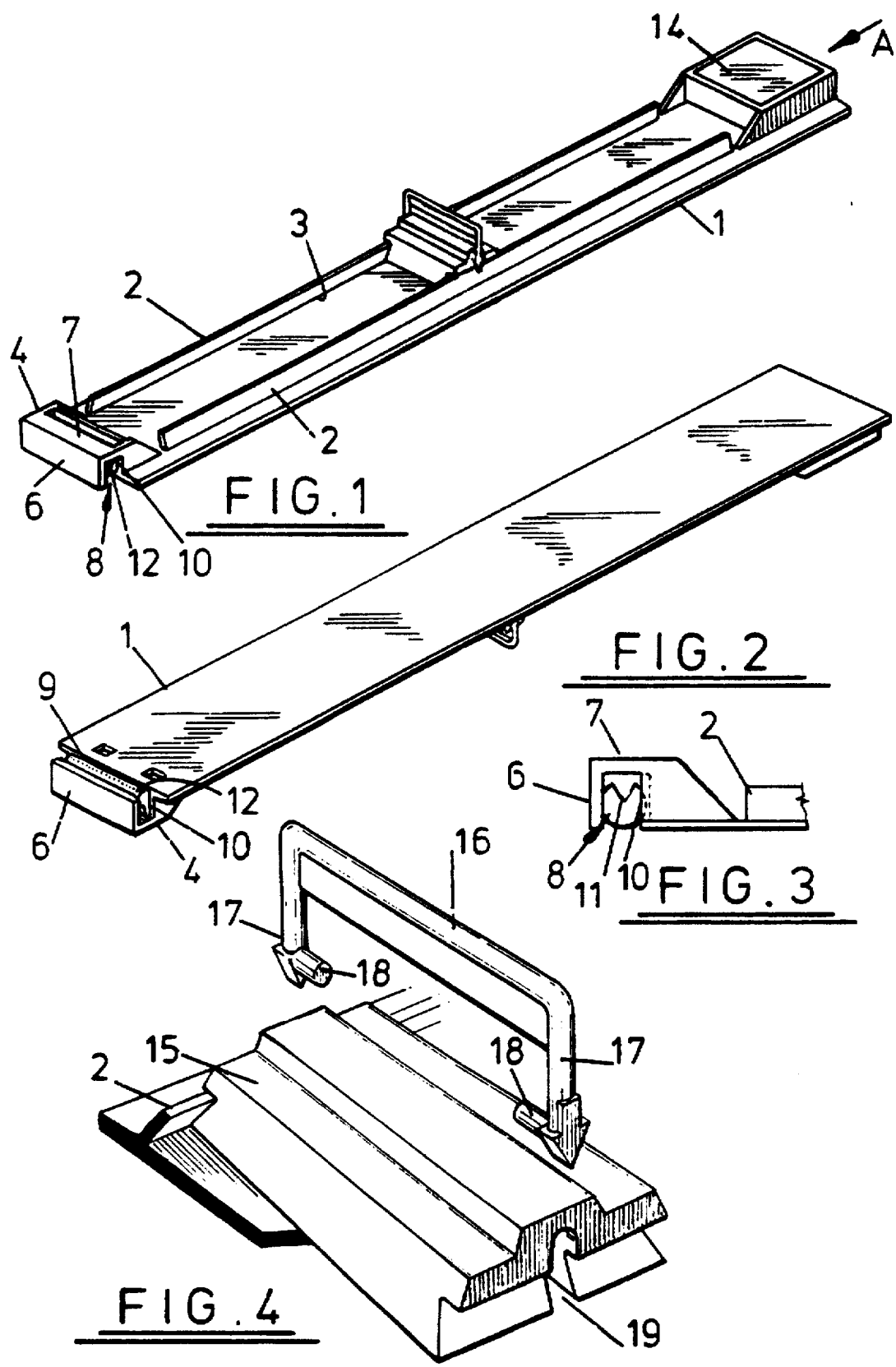

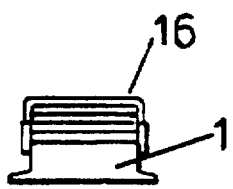
FIG.5
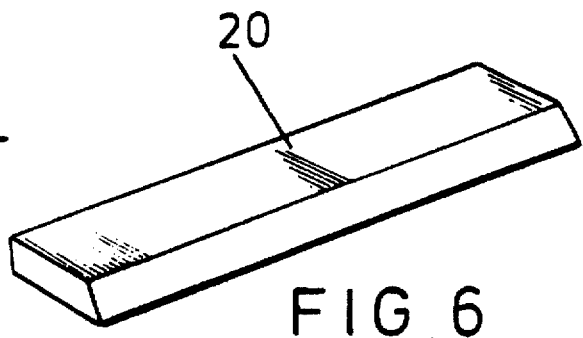
FIG.6
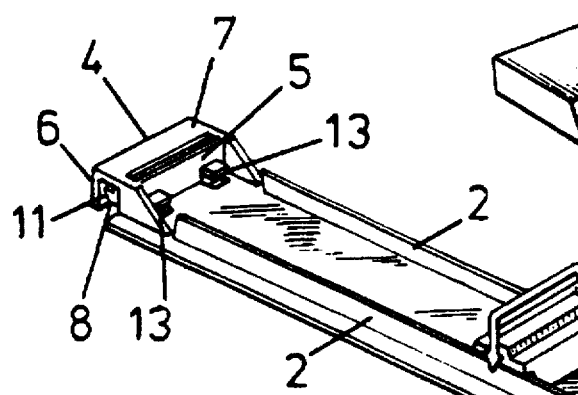
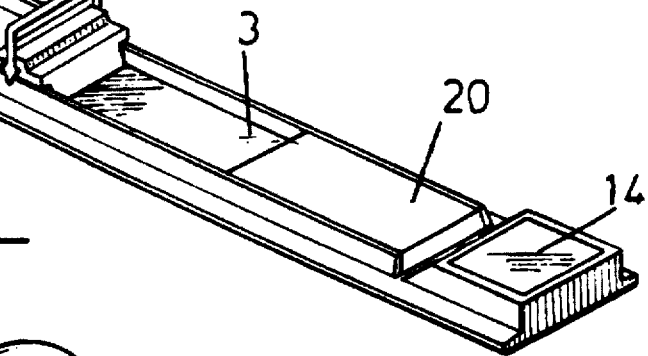
FIG.7
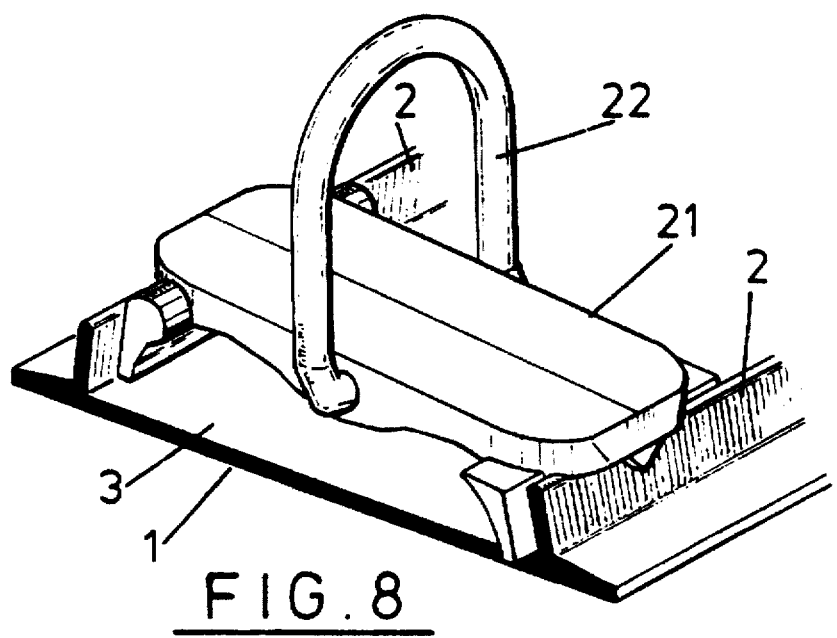
FIG.8

LETTER WEIGHING DEVICE WITH SLIDABLE FULCRUM

The present invention relates to a letter weighing device.

It is well known to provide a letter weighing device in the form of a lever to one end of which a letter can be secured, the exact weight of the letter being determined by positioning the lever on a fulcrum such that the lever is in equilibrium in a substantially horizontal position. The position of the fulcrum along the length of the lever is then a measure of the weight of the letter.

Generally in known devices there are predetermined fulcrum points each of which corresponds to a predetermined weight of letter to be supported by the lever. The weight of any one letter is then determined as being greater or less than a particular weight corresponding to one fulcrum point. This is considered adequate to determine the weight of letters for the purposes of postage rates as it is common practice for postal charges to be assessed at rates corresponding to particular ranges of weights. Thus fulcrum points are provided for each of the weights corresponding to a weight at which the postal rate increases from a first to a second rate.

One example of such a known letter weighing device is described in U.S. Pat. No. 1,201,063. This illustrates a combined ruler and postal scale in the form of a ruler which is substantially planar and incorporates a member which can be extended out of the plane of the ruler to define a fulcrum. A letter can be clipped to one end of the ruler so as to project vertically above the plane of the ruler when it is positioned on a flat surface, for example the top of a table. The fulcrum is moved longitudinally relative to the ruler until a point of equilibrium is reached. A scale along the track which can be followed by the fulcrum is then read to determine the weight of the letter. This known device does however present various problems. Firstly, the structure is relatively complicated and therefore manufacturing costs are relatively high. Furthermore, the weighing device is unstable as the letter has to be supported above the lever when it is placed upon a flat surface.

Another known letter weighing device is described in U.S. Pat. No. 2,507,073. This device is in the form of a generally planar ruler incorporating various other devices such a protractors. In contrast to the device described in U.S. Pat. No. 1,201,063, this device is used when weighing letters with its plane substantially vertical. Apertures are provided in the ruler in which fulcrum devices, e.g. pencils can be inserted. Letters are clipped beneath the ruler when being weighed and thus the device is not unstable. However, it is necessary to form in the ruler a relatively large number of apertures if a reasonable range of letter weights can be assessed. Furthermore, use of the device requires an additional implement such as a pencil to serve as a fulcrum.

A still further example of known letter weighing device is described in U.S. Pat. No. 2,612,365. This arrangement is similar to that described in U.S. Pat. No. 2,507,073 in that it is generally planar and in use is positioned in a substantially vertical plane. Rather than providing apertures in which fulcrum devices such as pencils can be inserted however the device incorporates integral pivoting members in the form of pins which are freely rotatable in apertures in the device and can be held by the user when the device is gripping a letter. This arrangement avoids the need for the user to provide a fulcrum member such as a pencil but the resultant structure is relatively complex.

It is an object of the present invention to provide an improved letter weighing device.

According to the present invention, there is provided a letter weighing device comprising an elongate member having upper and lower elongate surfaces, the upper elongate surface supporting two spaced apart and substantially parallel resilient ribs extending longitudinally along the elongate member so as to define a recess therebetween, at least a portion of each rib extending in a direction generally towards the other rib, a fulcrum member mounted upon the upper surface so as to be moveable along the length of the elongate member and by means of which the elongate member can be supported from above, and a clip adjacent one end of the elongate member by means of which a letter can be secured to the elongate member so as to be suspended therebeneath when the elongate member is supported from above by the fulcrum member.

Thus, the present invention provides a letter weighing device which has a slidable fulcrum and therefore which can indicate the exact (within a reasonable degree of accuracy determined by the tolerance to which the device is manufactured) of a letter or the like being weighed. Thus, a commonly calibrated device can be used in different countries which may operate different postal rate systems.

In addition, the letter weighing device in accordance with the present invention does not require the use of another implement, such as a pencil, to provide a fulcrum and neither is it required to support the device on a flat surface when being used to weigh a letter. Rather, the device is simply supported from above by a user, for instance holding the fulcrum member.

The parallel pair of ribs define a recess therebetween within which additional items can be stored. Examples of such items are replaceable postal rate cards and specially adapted wallets used to carry for example stamps. The rate cards, for instance, may be a snap fit between the resilient ribs.

Preferably each rib is inclined upwardly in a direction towards the other rib.

Preferably each rib extends adjacent to a respective longitudinal edge of the elongate member.

Preferably the fulcrum member is a snap fit between the two ribs. Thus, the ribs which are already provided to provide to recess described above serve a dual function of supporting the fulcrum member. Thus the device is advantageously simple in construction and therefore cheap to manufacture.

Preferably the fulcrum member is slidable between the two ribs along the length of the elongate member. Alternatively, the fulcrum member could be provided with rollers by means of which the fulcrum member can be rolled along the length of the elongate member between the two ribs.

Preferably the fulcrum member is provided with a handle by means of which the fulcrum member, and thereby the elongate member, can be supported. The handle is preferably pivotably fixed to the fulcrum member so as to be pivotable between a position in which it extends substantially perpendicularly to the upper surface of the elongate member and a stowed position in which extends in a plane substantially parallel to the upper surface of the elongate member. The handle may for instance be a generally U-shaped member defining two arms and a bridge portion, the end of each arm remote from the bridge member being fixed to the fulcrum member. Preferably the bridge portion of the handle extends in a direction transverse to the elongate member.

Preferably a weight scale is marked along the upper surface of the elongate member and the fulcrum member is provided with a pointer directed to the scale to provide an indication of the weight of a letter secured in said clip. The scale may for instance be marked on an outer surface of at least one of said ribs.

Preferably where the fulcrum member is provided with a handle, the handle is formed to provide said pointer.

The device may be provided with a counter weight at one end to increase the weight of the member at the end remote from the clip.

A separable counter weight may be provided in the form of a body which can be snap fitted between the ribs. Thus in this case the ribs fulfil a further function.

The clip may take any suitable form but preferably comprises a pair of members, at least one of which is resilient, which may be pushed apart to receive and secure a letter therebetween. For instance, the clip may comprise a recess extending in a direction transverse to the elongate member and a resilient member housed within the recess, said resilient member and a wall of the recess together forming the said pair of members. In this case, the resilient member preferably has a generally U-shaped cross section defining two limbs one of which bears against said wall of the recess and forms one of said pair of members.

Specific embodiments of the present invention will now be described, by way of example, with reference to the accompanying drawings, in which:

FIG. 1 is a perspective view from above of the first embodiment of a letter weighing device in accordance with the present invention;

FIG. 2 is a perspective view from below of the letter weighing device shown in FIG. 1;

FIG. 3 is a side view of part of the letter weighing device of FIG. 1 showing detail of a letter support clip;

FIG. 4 is a perspective view of part of the letter weighing device of FIG. 1 exploded to show detail of a fulcrum member;

FIG. 5 is an end elevation of the letter weighing device of FIG. 1 looking in the direction of arrow A;

FIG. 6 is a perspective view of a counter-weight which may be incorporated into the letter weighing device of FIG. 1;

FIG. 7 is a perspective view of the letter weighing device of FIG. 1 incorporating the counter-weight of FIG. 6;

FIG. 8 is a perspective view of part of a second embodiment of the present invention incorporating an alternative fulcrum member.

Figure 9:
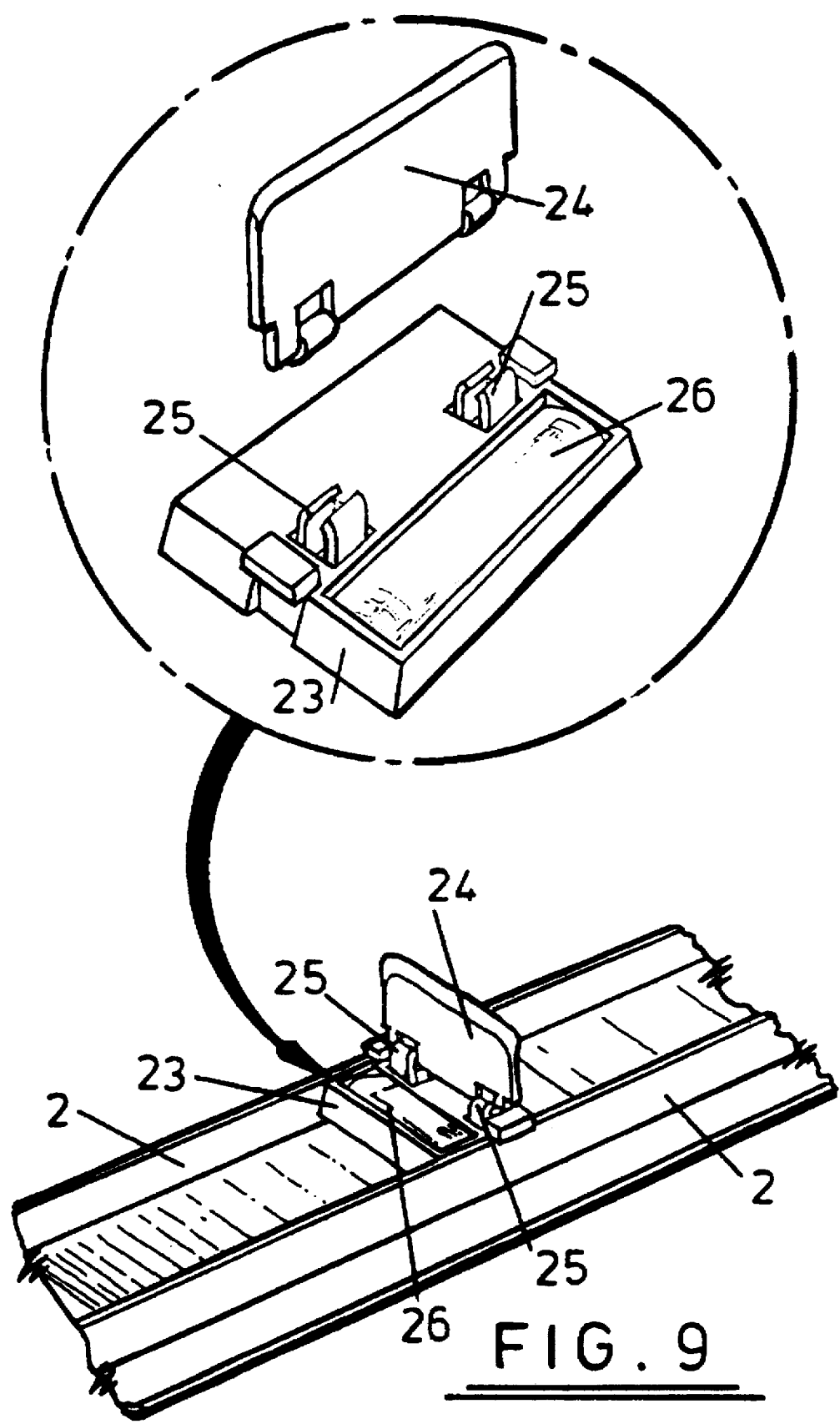
FIG. 9 is a perspective view of part of a third embodiment of the present invention incorporating a further alternative fulcrum member.

Referring to FIGS. 1 to 7 of the drawings, the illustrated letter weighing device comprises an elongate member 1 fabricated from moulded plastics in the general form of a ruler which supports a pair of parallel spaced apart longitudinal ribs 2 on its upper surface. The ribs 2 run along the length of the elongate member adjacent respective longitudinal edges thereof and are mutually inclined towards one another defining an elongate recess 3 therebetween.

One end of the elongate member supports a clip assembly designed to receive and retain a letter or the like. The clip assembly comprises a generally box-sectioned portion 4 formed from side walls 5 and 6 and an upper wall 7 (the side wall 5 is shown in FIG. 7) The arrangement is such that the box portion 4 defines a rectangular and generally square-sectioned recess 8 disposed transversely at one end of the elongate member 1 and open to the undersurface of the elongate member 1.

The internal surface of the side wall 5, having regard to the recess 8, is itself internally recessed defining a lower lip 9 and side lips 10.

A resilient clip member which is generally U-shaped in cross-section having limbs 11 and 12 is mounted within the recess 8 with both the limbs 11 and 12 directed generally upwards. A portion of the limb 12 of the resilient clip member is received within the recess defined in the internal surface of the side wall 5. The limbs 11 and 12 of the resilient clip member are forced together to allow the clip member to be received within the recess 8, the resilient clip member being held in position within the recess 8 both by the resilient action of the limbs and by the lips 9 and 10 defined by the inner surface of the wall 5.

In use a letter or the like may be inserted between the limb 11 of the resilient clip member and the internal surface of the side wall 6 of the portion 4 of the clip assembly and is retained therebetween.

On the external surface of the side wall 5 of the box portion 4 there are provided transversely spaced apart ledges 13 which extend perpendicularly from the wall 5 a short distance above the upper surface of the elongate member 1.

At the opposite end of the elongate member 1 to the clip the elongate member 1 is provided with an integral counter-weight portion 14.

A moveable fulcrum member 15, also fabricated from moulded plastics material, is slidably mounted to the upper surface of the elongate member 1 as a snap fit between the ribs 2. The fulcrum member 15 is provided with a rectangular hooped handle which has a bridge portion 16 interconnecting two parallel arms 17. The handle is pivotally attached to the fulcrum member 15 by means of inwardly extending pegs 18 which are provided at the ends of the arms 17 and which are received within grooves 19 provided in end walls of the fulcrum member 15. The handle is thus pivotable about the pegs 18 between an upstanding position in which it extends from the elongate member between the side ribs 2 and a stowed position in which it lies flat against an upper surface of the fulcrum member 15.

The ends of the arms 17 of the hooped handle are formed in the shape of arrows that overlap slightly the external surfaces of the ribs 2.

FIG. 6 illustrates a removable counter-weight 20 which is designed to be a snap-fit between the walls 2 and which can be incorporated into the letter weighing device, as shown in FIG. 6, if necessary to extend the range of letter weight which the device can handle.

The device illustrated in FIGS. 1 to 7 is constructed so that it may be used as a simple ruler and/or as a letter weighing device. When used as a letter weighing device, the fulcrum handle is first pivoted into its upstanding position so that the device may be supported in mid-air by a user, and a letter or the like is secured in the clip assembly. The fulcrum member 15 is then slid along the length of the elongate member 1 in either direction until equilibrium is reached with the elongate member balanced substantially horizontally. This weight of the letter can then be read off from a scale (not shown) which is provided on the external face of one, or both, of the ribs 2 at a point indicated by the arrows formed into the arms 17 of the handle.

As mentioned above, the removable counter-weight 20 may be used to extend the range of letter weights which the device can be used to weight. The counter-weight 20 may be fabricated from a suitably dense material for example a resin incorporating a high density filler. Alternative scales indicating the weight of a letter supported by the clip for cases when the counter-balance is or is not used may be indicated on the outer surfaces of the ribs 2, i.e. one scale on each wall. By the provision of a counter-weight which can be readily snapped into engagement with the elongate member 1 a letter weighing device is produced which can be used to weigh a relatively wide range of letter weights using a light weight ruler fabricated from plastics of the sort used in conventional rulers.

Through use of a sliding fulcrum member 15 the exact weight (having regard to the tolerances and limitations of the device) of a letter can be obtained and therefore the device can be used without modification in different countries which may operate different postal rate assessing systems. For instance, postal charges are normally assessed at rates corresponding to particular ranges of weights, but these ranges are not necessarily the same for different postal systems. In addition the postal rate bands of any particular postal system may be up-dated from time to time which might render some of the prior art letter weighing device obsolete but not so the present device.

Information on postal rates and postal bands for any particular system may be printed on the elongate member 1, for instance on its undersurface. However, preferably such information is provided on additional removable cards (not shown) which are dimensioned to be received within the recess 3 before the ribs 2 are held in position to the ribs 2. Thus a single elongate member 1 may be produced suitable for use in all postal rate systems and the information necessary for implementing the device in a particular system is provided in a cheap and readily updatable form, i.e. a separate rate card, which can be readily incorporated into the device.

The recess 3 defined between the ribs 2 may also be used to house other accessories between the ribs 2 such as a wallet containing stamps etc. Such a wallet may not be a snap fit between the ribs 2 but will still be retained in the base of the recess 3 by the inclined ribs 2. One end of such a wallet may be inserted under the ledges 13 for additional support.

It will thus be seen that the provision of the ribs 2, and the recess 3 defined therebetween, is very advantageous in that it provides: a simple and effective means by way of which a fulcrum member may be slidably mounted to the elongate member 1; a simple snap fit housing for a removable counter-weight which is itself simple and cheap in construction; and a convenient storage area for receiving replaceable information such as postal rate cards and/or accessories such as stamp wallets.

The weighing device according to the present invention is also advantageously simple to use as it simply requires to be supported its the handle in one hand of a user. A separate fulcrum member is not required as in the case of some of the prior art letter weighing devices and neither does the device need to be supported upon a flat surface.

A modification to the letter weighing device described above and shown in FIGS. 1 to 6 is illustrated in FIG. 8. This shows an alternative fulcrum member to that shown in FIGS. 1 to 6 otherwise details of the letter weighing device are unchanged. The modified fulcrum 21 is again a snap fit between the side walls 2 and has a hooped handle 22. However, in this case the hooped handle extends between sides of the fulcrum member such that it extends along the axis of the elongate member 1. With this arrangement the handle must either be held lightly between the fingers of the user or a separate support such as a pencil must be inserted through the looped handle in order to allow the device to pivot freely when weighing a letter.

A further alternative fulcrum member is shown in FIG. 9. The modified fulcrum member 23 is designed to be a snap-fit between the side walls 2. In this case the handle comprises a flat tag 24 which is pivotally fixed to the fulcrum member 23 by way of resilient clips 25 provided by the fulcrum member 23. When not being used as a handle, the tag 24 may simply be pivoted to lie flat against the upper surface of the fulcrum 23. The fulcrum member 23 houses a lens 26 which extends laterally across the recess 3 on one side of the tag handle 24. The lens may be used to magnify information carried on a postal rate card or the like which may be stored within the recess 3 as mentioned above.

It will be appreciated that there are many other modifications which could be made to the embodiments of the invention discussed above and shown in the drawings without departing from the present invention. For instance alternative forms of clip may be employed.

I claim:

1. A letter weighing device comprising an elongate member having upper and lower elongate surfaces, the upper elongate surface supporting two spaced apart and substantially parallel resilient ribs extending longitudinally along the elongate member so as to define a recess therebetween, at least a portion of each rib extending in a direction generally towards the other rib, a fulcrum member mounted upon the upper surface between said ribs so as to be moveable along the length of the elongate member, said fulcrum member supporting the elongate member from above, and a clip adjacent one end of the elongate member by means of which a letter can be secured to the elongate member so as to be suspended therebeneath when the elongate member is supported from above by the fulcrum member.

2. A letter weighing device according to claim 1, wherein each rib is inclined upwardly in a direction towards the other rib.

3. A letter weighing device according to claim 1, wherein each rib extends adjacent a respective longitudinal edge of the elongate member.

4. A letter weighing device according to claim 1, wherein the lower surface of the elongate member is substantially planar.

5. A letter weighing device according to any claim 1, wherein the fulcrum member is a snap fit between the two ribs.

6. A letter weighing device according to claim 5, wherein the fulcrum member is slidable between the two ribs along the length of the elongate member.

7. A letter weighing device according to any claim 1, wherein the fulcrum member is provided with a handle by means of which the fulcrum member, and thereby the elongate member, can be supported.

8. A letter weighing device according to claim 7, wherein said handle is pivotably fixed to the fulcrum member so as to be pivotable between a position in which it extends substantially perpendicularly to the upper surface of the elongate member and a stowed position in which extends in a plane substantially parallel to the upper surface of the elongate member.

9. A letter weighing device according to claim 8, wherein the handle is a generally U-shaped member defining two arms and a bridge portion, the end of each arm remote from the bridge member being fixed to the fulcrum member.

10. A letter weighing device according to claim 5, wherein the bridge portion of the handle extends in a direction transverse to the elongate member.

11. A letter weighing device according to claim 1, wherein a weight scale is marked along the upper surface of the elongate member and the fulcrum member is provided with a pointer directed to the scale to provide an indication of the weight of a letter secured in said clip.

12. A letter weighing device according to claim 11, wherein the scale is marked on an outer surface of at least one of said ribs.

13. A letter weighing device according to claim 11 in which the fulcrum member is provided with a handle, wherein the handle is formed to provide said pointer.

14. A letter weighing device according to claim 1, wherein a counter weight is provided to increase the weight of the member at the end remote from the clip.

15. A letter weighing device according to any claim 1, wherein a separable counter weight is provided in the form of a body which can be snap fitted between the ribs.

16. A letter weighing device according to any claim 1, wherein a postal rate card is provided which can be removable stored between the two ribs.

17. A letter weighing device according to any claim 1, wherein a wallet is provided which can be removably stored between the two ribs.

18. A letter weighing device according to claim 7, wherein the wallet is adapted to receive stamps or the like.

19. A letter weighing device according to any claim 1, wherein the clip comprises a pair of members, at least one of which is resilient which may be pushed apart to receive and secure a letter therebetween.

20. A letter weighing device according to claim 19, wherein the clip comprises a recess extending in a direction transverse to the elongate member and a resilient member housed within the recess, said resilient member and a wall of the recess together forming the said pair of members.

21. A letter weighing device according to claim 20, wherein the resilient member is generally U-shaped in cross section defining two limbs one of which bears against said wall of the recess and forms one of said pair of members.

* * * * *